(12) United States Patent
Chen et al.

(10) Patent No.: US 9,969,110 B2
(45) Date of Patent: May 15, 2018

(54) PROCESS OF MAKING A WEAR-RESISTANT ACTUATING LEVER

(71) Applicants: Waterson Chen, Taichung (TW); Chien-Chu Chen, Taichung (TW)

(72) Inventors: Waterson Chen, Taichung (TW); Chien-Chu Chen, Taichung (TW)

( * ) Notice: Subject to any disclaimer, the term of this patent is extended or adjusted under 35 U.S.C. 154(b) by 299 days.

(21) Appl. No.: 15/044,204

(22) Filed: Feb. 16, 2016

(65) Prior Publication Data
US 2017/0232648 A1    Aug. 17, 2017

(51) Int. Cl.
*B29C 45/14*    (2006.01)
*F16B 2/18*    (2006.01)
*B29K 27/18*    (2006.01)
*B29L 31/00*    (2006.01)
*F16B 7/14*    (2006.01)
*B29C 45/26*    (2006.01)

(52) U.S. Cl.
CPC ........ *B29C 45/14336* (2013.01); *B29C 45/14* (2013.01); *F16B 2/185* (2013.01); *B29C 45/14008* (2013.01); *B29C 45/14311* (2013.01); *B29C 45/14344* (2013.01); *B29C 45/2616* (2013.01); *B29C 45/2628* (2013.01); *B29K 2027/18* (2013.01); *B29K 2995/0087* (2013.01); *B29L 2031/7278* (2013.01); *F16B 7/1418* (2013.01); *F16B 7/1454* (2013.01)

(58) Field of Classification Search
CPC ........ F16B 2/18; F16B 7/1418; F16B 7/1454; B29L 2031/7278; B29L 2031/728; B29K 2027/18; B29C 45/0001; B29C 45/14; B29C 45/14008; B29C 45/14311; B29C 45/14336; B29C 45/14344; B29C 45/2616; B29C 45/2628; B29C 2045/14327; B29C 2045/1436; B29C 2045/14442
USPC ...................... 264/259, 271.1, 273, 274, 279
See application file for complete search history.

(56) References Cited

U.S. PATENT DOCUMENTS

| | | | |
|---|---|---|---|
| 8,083,265 B1 * | 12/2011 | Chen ...................... | F16L 37/18 285/312 |
| 2013/0106095 A1 * | 5/2013 | Chen ...................... | F16L 37/18 285/85 |

* cited by examiner

*Primary Examiner* — Seyed Masoud Malekzadeh
*Assistant Examiner* — Lawrence D. Hohenbrink, Jr.
(74) *Attorney, Agent, or Firm* — Stroock & Stroock & Lavan LLP (57) ABSTRACT

A process of making a wear-resistant actuating lever is disclosed. The wear-resistant actuating lever includes a lever body made of metal and an integrally molded cover layer made of a polytetrafluoroethylene-based material. The lever body includes a head segment having an upper major surface, a cam-forming surface, a through hole, and at least one upper concavity formed in the upper major surface. The integrally molded cover layer covers on the head segment and is molded thereon using plastic injection molding, and includes an upper portion covering an upper major surface, a cam portion covering a cam-forming surface, and an upper protuberance portion in the upper concavity.

10 Claims, 11 Drawing Sheets

PROCESS OF MAKING A WEAR-RESISTANT ACTUATING LEVER

FIELD

The disclosure relates to a process of making an actuating lever, more particularly to a process of making a wear-resistant actuating lever of a cam-lock actuating device for use in a locking coupling assembly.

BACKGROUND

Figure 1:
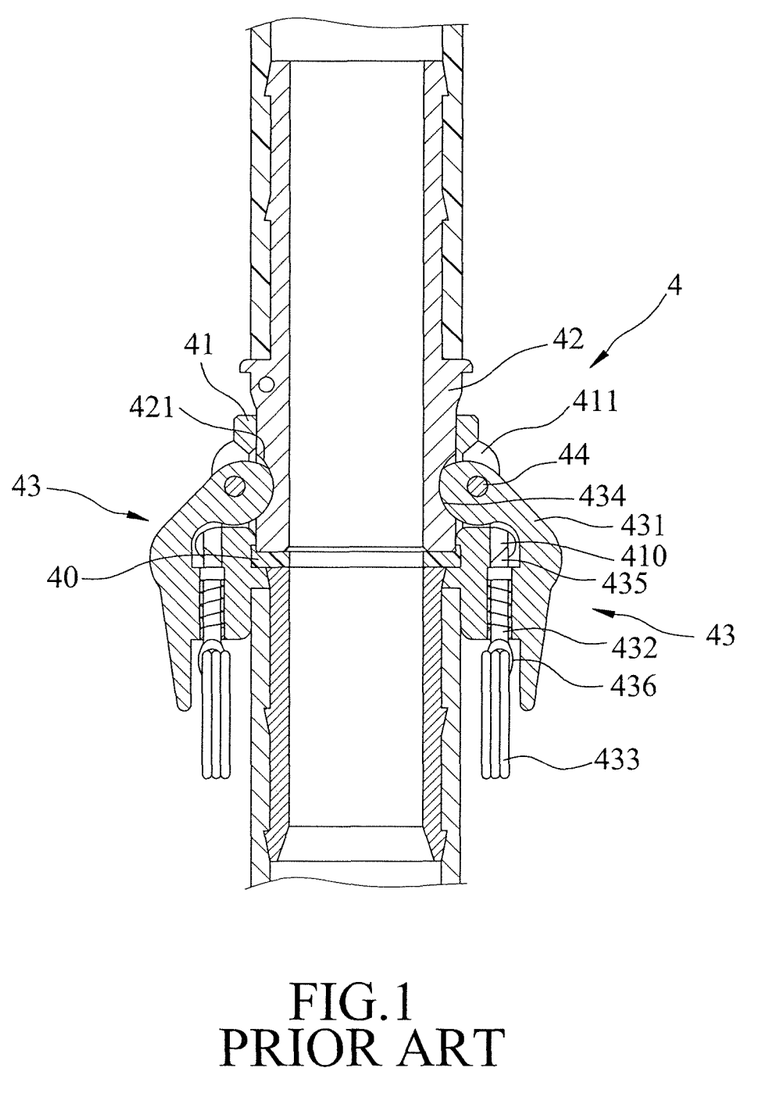
FIG. 1 is a cross-sectional view of a conventional locking coupling assembly.

Referring to FIG. 1, a conventional locking coupling assembly 4 is shown to include a cylindrical body 41 connected to a female coupling tube (not shown), a male coupling tube 42 inserted into the cylindrical body 41 and fluid-tightly engaged therewith by means of a seal ring 40, and two cam-lock actuating devices 43. Each of the cam-lock actuating devices 43 includes an actuating lever 431, a spring-biased lock bolt 432, and a pull ring 433. The actuating lever 431 is pivotably mounted to a lug 411 of the cylindrical body 41 by a pivot pin 44, and has a cam surface 434 extending into the cylindrical body 41 for engaging an annular grooved surface 421 of the male coupling tube 42 when the actuating lever 431 is at a locking position. The spring-biased lock bolt 432 is movably received in a hole formed in the actuating lever 431 and has an upper end 435 which is biased to be inserted into a locking hole 410 in the cylindrical body 41 for retaining the actuating lever 431 at the locking position. The pull ring 433 is attached to a lower end 436 of the spring-biased lock bolt 432 such that by pulling the pull ring 433, the upper end 435 is moved downwardly to be disengaged from the locking hole 410 so as to permit turning of the actuating lever 431 to an unlocking position, where the cam surface 434 is disengaged from the annular grooved surface 421. Thus, the locking coupling assembly 4 can be used to quickly connect and disconnect two tubular members, such as hoses, pipes, etc.

During displacement of the actuating lever 431 between the locking and unlocking positions, the cam surface 434 of the actuating lever 431 will rub against the annular grooved surface 421 of the male coupling tube 42, which may produce spark, static electricity, or metal powders due to wearing of the cam surface 434 and/or the annular grooved surface 421. As such, the conventional locking coupling assembly 4 cannot be used to connect tubular members for transporting a flammable material or a food material.

To prevent the production of spark, etc., the cam surface 434 of the actuating lever 431 may be roughened using, for example, chemicals to permit a thin layer of polytetrafluoroethylene to be coated over the roughened cam surface 434. However, a bonding force between the polytetrafluoroethylene layer and the cam surface 434 is insufficient, and the polytetrafluoroethylene layer may be delaminated from the cam surface 434 after a period of use.

SUMMARY

Therefore, an object of the disclosure is to provide a process of making a wear-resistant actuating lever of a cam-lock actuating device for use in a locking coupling assembly. A wear-resistant actuating lever made by the process of this disclosure has a lever body and an integrally molded cover layer covering a head segment of the lever body. The integrally molded cover layer is made of a polytetrafluoroethylene-based material, and is less likely to delaminate from the head segment.

According to the disclosure, a process of making a wear-resistant actuating lever of a cam-lock actuating device is provided. The wear-resistant actuating lever has a pivot hole extending along a pivot axis for permitting the wear-resistant actuating lever to be pivotally mounted to a lug of a locking coupling assembly. The process includes steps of:

(a) providing a lever body including a head segment, an arm segment opposite to the head segment in a lengthwise direction, and a neck segment disposed between the head segment and the arm segment, the head segment defining a central line parallel to the pivot axis, and including a cam-forming surface extending angularly about the central line, an upper cut-out portion having an upper major surface to which the central line is normal, and an upper shoulder surface which is between the upper major surface and an upward surface of the neck segment, at least one upper concavity in the upper major surface, and a through hole formed in the upper major surface and extending along the pivot axis through the head segment;

(b) disposing the head segment of the lever body in a mold cavity of a mold, the mold including upper and lower mold halves which have upper and lower interior surfaces, respectively, the upper and lower interior surfaces of the upper and lower mold halves cooperatively defining therebetween the mold cavity, the mold further including a sprue through which a polytetrafluoroethylene-based material is permitted to be injected into the mold cavity, the upper and lower interior surfaces being patterned such that the upper major surface, the upper shoulder surface, and the upper interior surface cooperatively define thereamong an upper space which has a contour substantially the same as a contour of the upper cut-out portion, such that the cam-forming surface is spaced apart from the upper and lower interior surfaces by a predetermined clearance which extends upwardly to be in spatial communication with the upper space, and such that an axial space is defined within the through hole for serving as the pivot hole, the axial space being not in spatial communication with the upper space; and (c) injecting the polytetrafluoroethylene-based material into the mold cavity through the sprue under a high pressure to fill the upper space, the predetermined clearance, and the upper concavity with the polytetrafluoroethylene-based material to thereby obtain an integrally molded cover layer which includes an upper portion covering the upper major surface, an upper protuberance portion formed in the upper concavity, and a cam portion covering the cam-forming surface.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Before the disclosure is described in greater detail, it should be noted that like elements are denoted by the same reference numerals throughout the disclosure.

Figure 2:
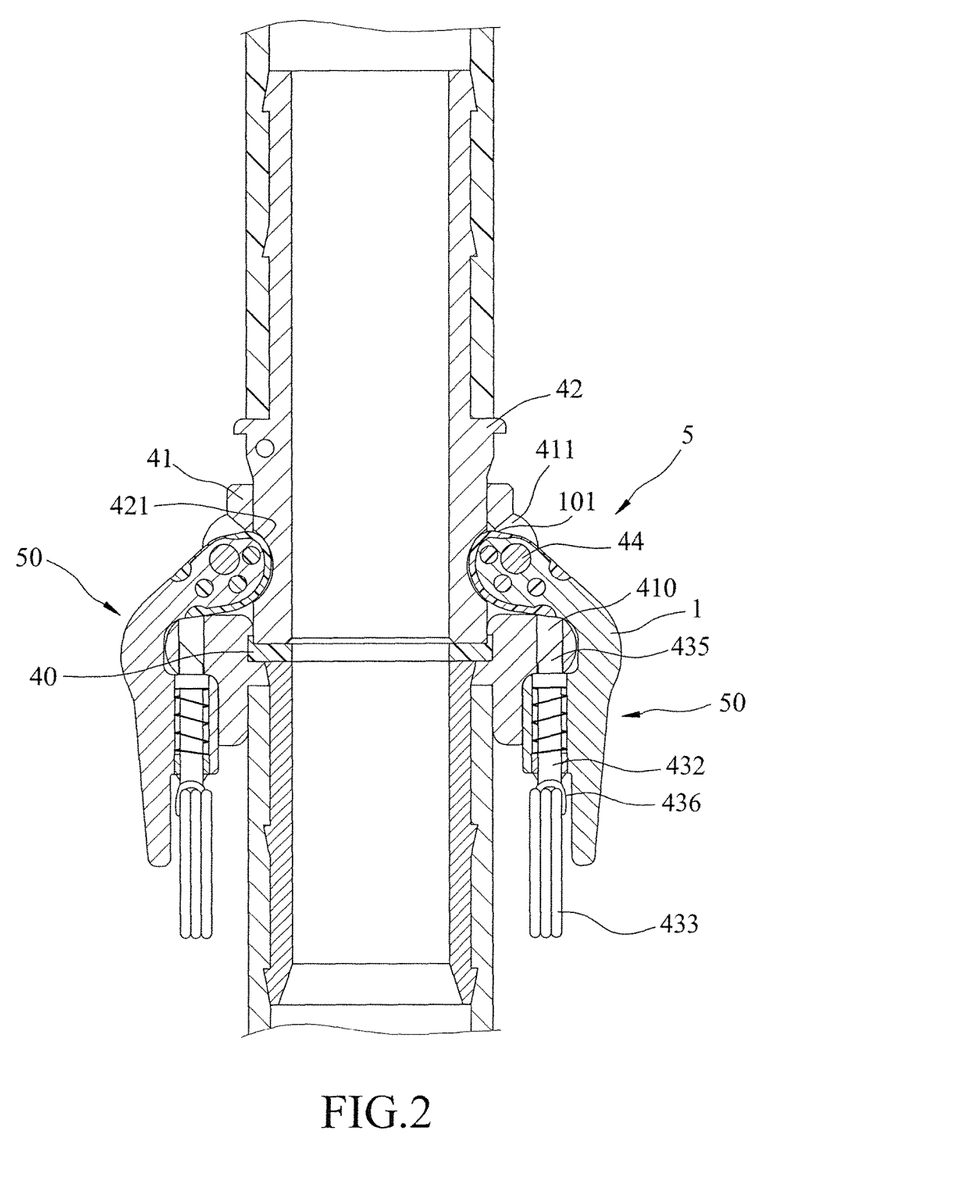
FIG. 2 is a cross-sectional view of a locking coupling assembly according to a first embodiment of the disclosure.

Referring to FIG. 2, a locking coupling assembly 5 according to a first embodiment of the disclosure is shown to include a cylindrical body 41 connected to a female coupling tube (not shown), a male coupling tube 42 inserted into the cylindrical body 41 and fluid-tightly engaged therewith by means of a seal ring 40, and two cam-lock actuating devices 50.

Figure 3:
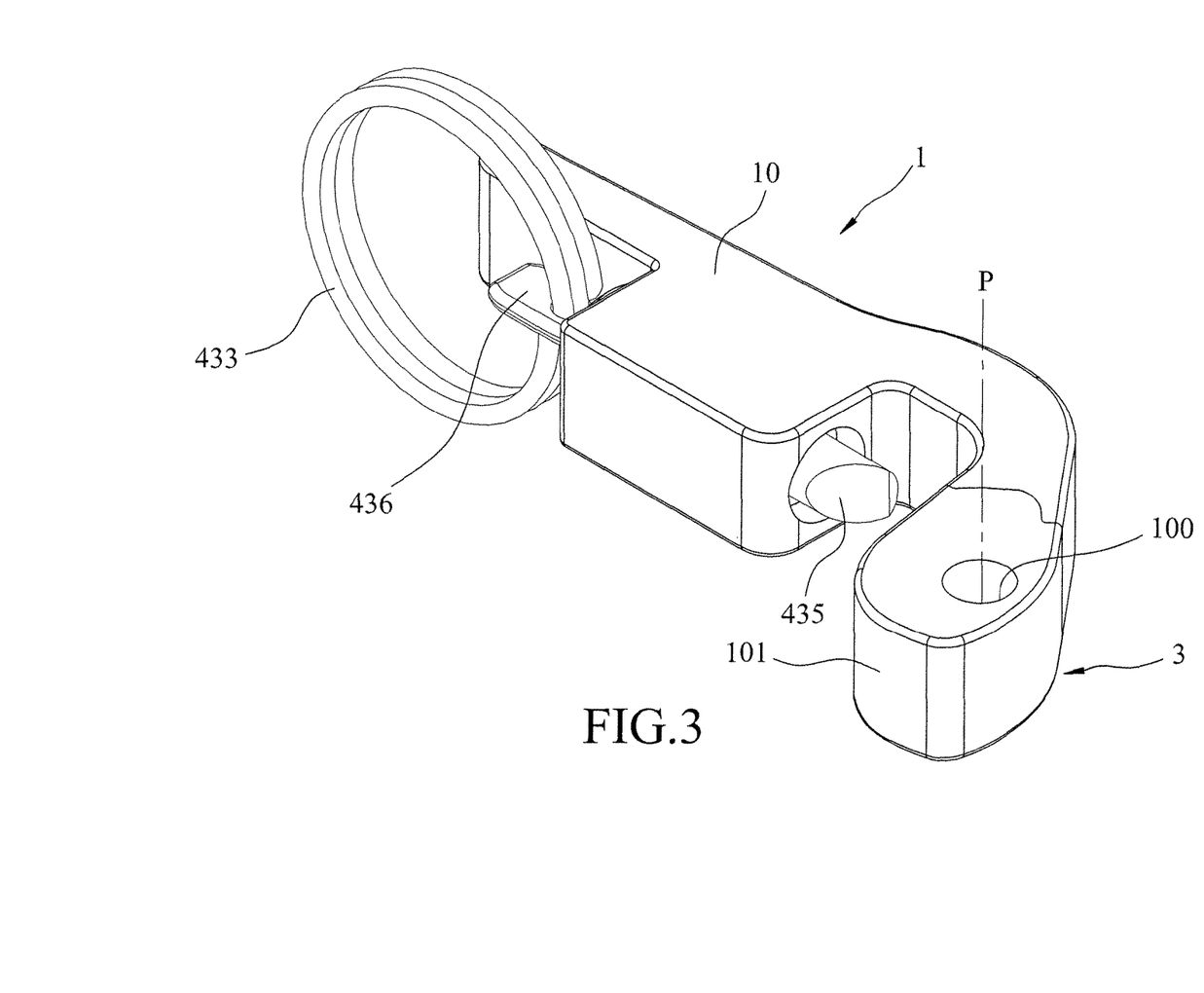
FIG. 3 is a perspective view of a wear-resistant actuating lever of the locking coupling assembly according to a first embodiment of the disclosure.
Figure 4:
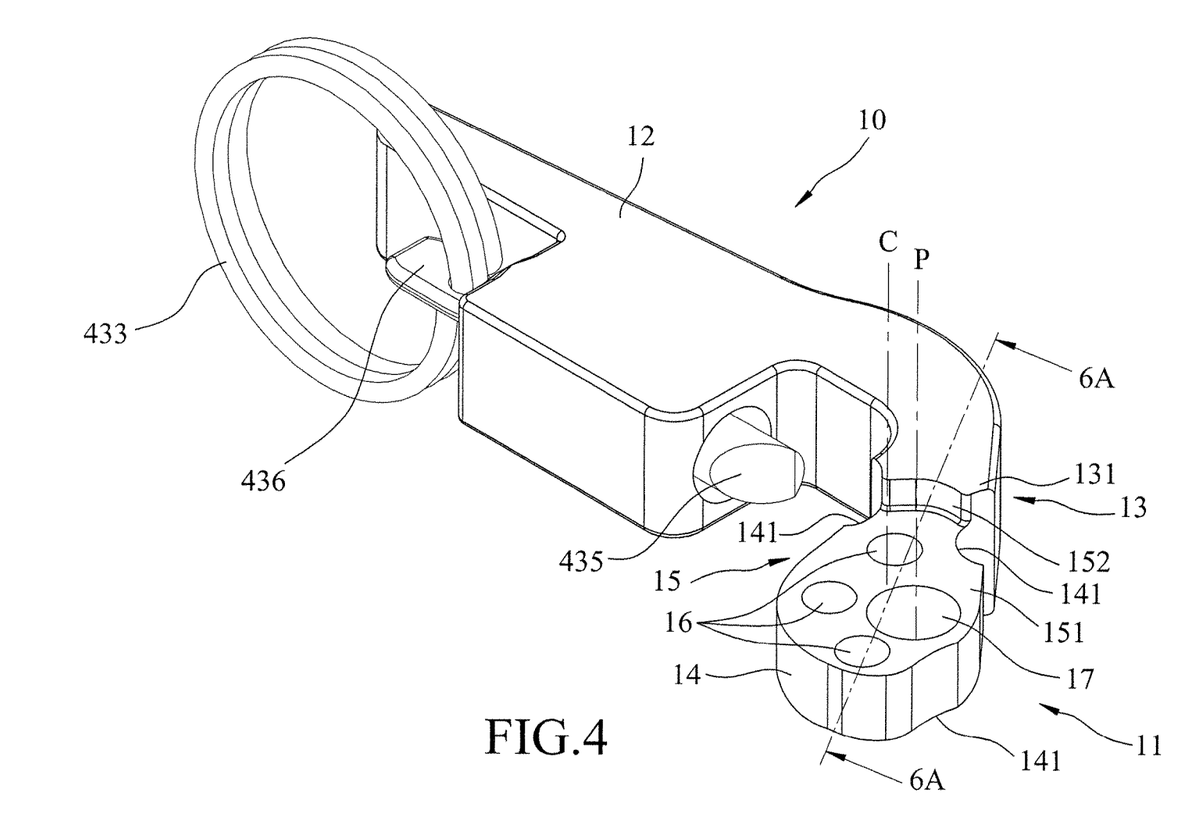
FIG. 4 is a perspective view illustrating a lever body of the wear-resistant actuating lever according to the first embodiment of the disclosure.

Referring to FIGS. 2, 3 and 4, each of the cam-lock actuating devices 50 includes a wear-resistant actuating lever 1, a spring-biased lock bolt 432, and a pull ring 433. The wear-resistant actuating lever 1 is pivotably mounted to a lug 411 of the cylindrical body 41 by a pivot pin 44, and has a cam surface 101 extending into the cylindrical body 41 for engaging an annular grooved surface 421 of the male coupling tube 42 when the wear-resistant actuating lever 1 is at a locking position. The spring-biased lock bolt 432 is movably received in a hole formed in the actuating lever 431, and has an upper end 435 which is biased to be inserted into a locking hole 410 in the cylindrical body 41 for retaining the wear-resistant actuating lever 1 at the locking position. The pull ring 433 is attached to a lower end 436 of the spring-biased lock bolt 432 such that by pulling the pull ring 433, the upper end 435 is moved downwardly to be disengaged from the locking hole 410 so as to permit turning of the wear-resistant actuating lever 1 to an unlocking position, where the cam surface 101 is disengaged from the annular grooved surface 421. Thus, the locking coupling assembly 5 can be used to quickly connect and disconnect two tubular members, such as hoses, pipes, etc.

The wear-resistant actuating lever 1 includes a lever body 10, an integrally molded cover layer 3, and a pivot hole 100. The lever body 10 is made of metal. The integrally molded cover layer 3 is made of a polytetrafluoroethylene-based material and is formed to cover a portion of the lever body 10 by plastic injection molding. The pivot hole 100 extends along a pivot axis (P) and through the lever body 10 and the integrally molded cover layer 3 to permit the wear-resistant actuating lever 1 to be pivotally mounted to the lug 411 of the cylindrical body 41 by the pivot pin 44.

Examples of the polytetrafluoroethylene-based material include DuPont™ Teflon® PFA series fluoropolymer resin, such as PFA 340-J, PFA 350-J, PFA 420HP-J, PFA 440HP-J, PFA 450HP-J, PFA 451HP-J, PFA 920HP Plus, PFA 940HP Plus, PFA 950HP Plus, PFA 941HP Plus, PFA 951HP Plus, etc. In this embodiment, the polytetrafluoroethylene-based material is DuPont™ Teflon® 440 HP-J fluoropolymer resin.

A process of making the wear-resistant actuating lever 1 according to the first embodiment of the disclosure will be described with reference to FIGS. 4, 5, and 6A to 6C. The process includes steps (a) to (c).

Figure 6A:
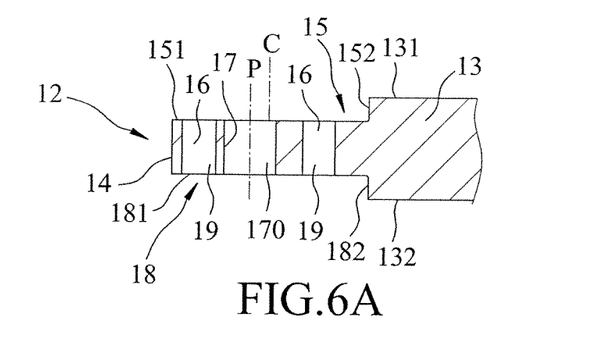
FIG. 6A is a cross-sectional view taken along line 6A-6A of FIG. 4.

In step (a), the lever body 10 is provided. As shown in FIGS. 4 and 6A, the lever body 10 includes a head segment 11, an arm segment 12 opposite to the head segment 11 in a lengthwise direction, and a neck segment 13 disposed between the head segment 11 and the arm segment 12. The head segment 11 defines a central line (C) parallel to the pivot axis (P), and includes a cam-forming surface 14, an upper cut-out portion 15, at least one upper concavity 16, and a through hole 17. The cam-forming surface 14 extends angularly about the central line (C). The upper cut-out portion 15 has an upper major surface 151 to which the central line (C) is normal, and an upper shoulder surface 152 between the upper major surface 151 and an upward surface 131 of the neck segment 13. The upper concavity 16 is formed in the upper major surface 151. The through hole 17 is formed in the upper major surface 151 and extends along the pivot axis (P) through the head segment 11. The pivot hole 100 has a dimension not larger than that of the through hole 17. In this embodiment, the pivot hole 100 has a dimension substantially the same as that of the through hole 17.

Figure 6B:
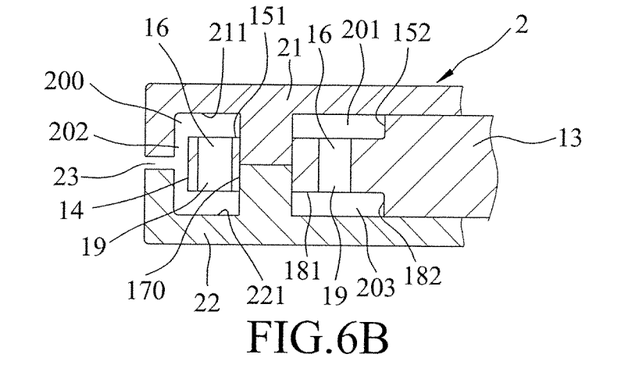
FIG. 6B is a cross-sectional view illustrating that the lever body is disposed in a mold.

In step (b), the head segment 11 of the lever body 10 is disposed in a mold cavity 200 of a mold 2. As shown in FIG. 6B, the mold 2 includes upper and lower mold halves 21, 22 which have upper and lower interior surfaces 211, 221, respectively. The upper and lower interior surfaces 211, 221 of the upper and lower mold halves 21, 22 cooperatively define therebetween the mold cavity 200. The mold 2 further includes a sprue 23 through which the polytetrafluoroethylene-based material is permitted to be injected into the mold cavity 200. The upper and lower interior surfaces 211, 221 are patterned such that the upper major surface 151, the upper shoulder surface 152, and the upper interior surface 211 cooperatively define thereamong an upper space 201 which has a contour substantially the same as a contour of the upper cut-out portion 15, such that the cam-forming surface 14 is spaced apart from the upper and lower interior surfaces 211, 221 by a predetermined clearance 202 which extends upwardly so as to be in spatial communication with the upper space 201, and such that an axial space 170 is defined within the through hole 17 for serving as the pivot hole 100. The axial space 170 is not in spatial communication with the upper space 201.

Figure 5:
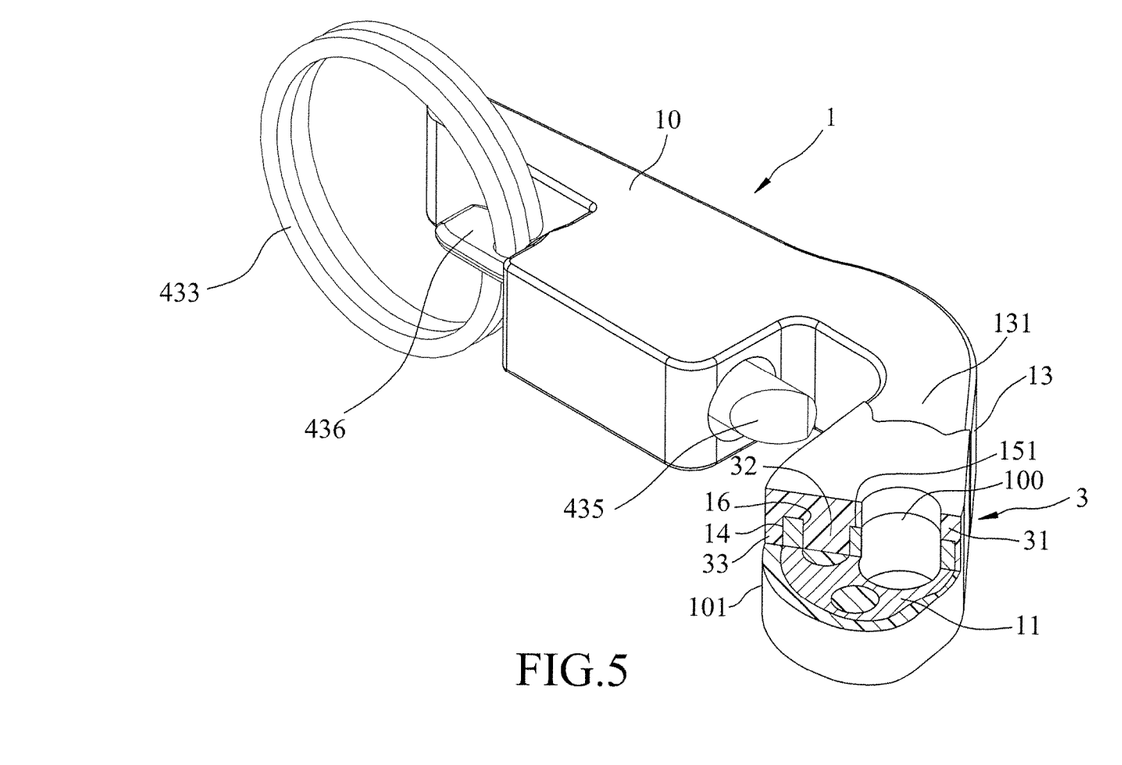
FIG. 5 is a partially sectioned view of the wear-resistant actuating lever according to the first embodiment of the disclosure.
Figure 6C:
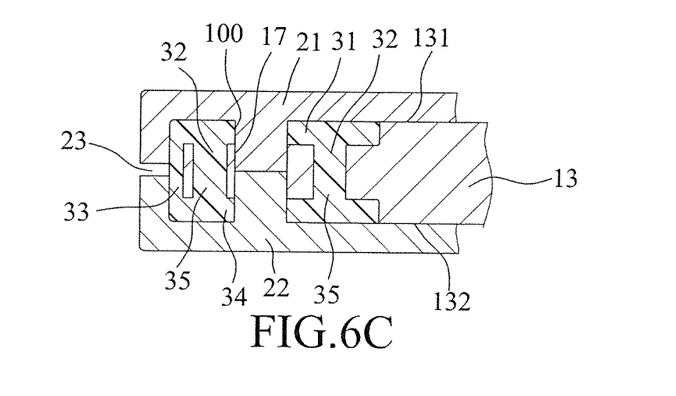
FIG. 6C is a cross-sectional view similar to FIG. 6B but illustrating that a mold cavity of the mold is filled with a polytetrafluoroethylene-based material.

In step (c), the polytetrafluoroethylene-based material is injected into the mold cavity 200 through the sprue 23 under a high pressure to fill the upper space 201, the predetermined clearance 202, and the upper concavity 16 with the polytetrafluoroethylene-based material to thereby obtain the integrally molded cover layer 3. As shown in FIGS. 5, 6B, and 6C, the integrally molded cover layer 3 includes an upper portion 31 covering the upper major surface 151, an upper protuberance portion 32 formed in the upper concavity 16, and a cam portion 33 which covers the cam-forming surface 14 and which has the cam surface 101. In step (c), the polytetrafluoroethylene-based material (such as DuPont™

Teflon® 440 HP-J fluoropolymer resin) in the mold cavity 200 can be processed by any conventional molding method. In this embodiment, the upper portion 31 is flush with the upward surface 131 of the neck segment 13.

It should be noted that as the axial space 170 for serving as the pivot hole 100 is not in spatial communication with the upper space 201 in step (b), the polytetrafluoroethylene-based material injected into the upper space 201 in step (c) will not flow to the axial space 170, thereby forming the pivot hole 100.

Thereafter, the integrally molded cover layer 3 together with the lever body 10 is removed from the mold 2. Because the integrally molded cover layer 3 is made of the polytetrafluoroethylene-based material which has a very low coefficient of friction against any solid, the integrally molded cover layer 3 together with the lever body 10 can be easily removed from the mold 2.

As shown in FIG. 6A, the head segment 11 further includes a lower cut-out portion 18 and at least one lower concavity 19. The lower cut-out portion 18 has a lower major surface 181 to which the central line (C) is normal, and a lower shoulder surface 182 between the lower major surface 181 and a downward surface 132 of the neck segment 13. The lower concavity 19 is formed in the lower major surface 181 and extends toward the upper major surface 151 to be in spatial communication with the upper concavity 16.

With reference to FIG. 6B, in step (b), the lower major surface 181, the lower shoulder surface 182, and the lower interior surface 221 cooperatively define thereamong a lower space 203 which has a contour substantially the same as a contour of the lower cut-out portion 18 (see FIG. 6A), and the predetermined clearance 202 extends downwardly so as to be in spatial communication with the lower space 203.

With reference to FIGS. 6B and 6C, in step (c), the polytetrafluoroethylene-based material injected under high pressure into the mold cavity 200 through the sprue 23 further fills the lower space 203 and the lower concavity 19. The integrally molded cover layer 3 obtained in step (c) further includes a lower portion 34 covering the lower major surface 181, and a lower protuberance portion 35 formed in the lower concavity 19. The lower portion 34 is flush with the downward surface 132 of the neck segment 13.

Because the pivot hole 100 of the wear-resistant actuating lever 1 extends through the head segment 1 and the integrally molded cover layer 3, and because the integrally molded cover layer 3 made of the polytetrafluoroethylene-based material can reduce the friction force against the pivot pin 44 that extends through the pivot hole 100, the wear-resistant actuating lever 1 which is pivotally mounted to the lug 411 by the pivot pin 44 is more easily displaceable between the locking and unlocking positions.

As shown in FIG. 4, the cam-forming surface 14 is formed with a plurality of grooves 141 which are displaced from one another about the central line (C).

In this embodiment, the head segment 11 includes a plurality of the upper concavities 16, which are displaced from one another about the pivot axis (P), and a plurality of the lower concavities 19, which are displaced from one another about the pivot axis (P) (see FIGS. 4 and 6A).

Due to the configuration of the integrally molded cover layer 3, particularly the upper and lower protuberance portions 32, 35 of the integrally molded cover layer 3 in the upper and lower concavities 16, 19 of the head segment 11, the cam portion 33 of the integrally molded cover layer 3 is less likely to delaminate from the cam-forming surface 14 of the head segment 11.

To reduce the stress concentration factor and increase the contact area between the integrally molded cover layer 3 and the head segment 11 so as to prevent the delamination of the integrally cover layer 3 from the head segment, the upper and lower concavities 16, 19 are designed to be offset from the cam-forming surface 14 and the through hole 17, and each of the upper and lower concavities 16, 19 may be designed to have a larger curvature radius or a gradually varying curvature radius.

In addition, a center-to-center distance between two adjacent ones of the upper or lower concavities 16 or 19 should be considered. If the center-to-center distance is too small, the stress concentration factor would increase and the mechanical strength of the head segment 11 would be adversely affected. If the center-to-center distance is too large, the bonding force between the integrally molded cover layer 3 and the head segment 11 is insufficient.

In this embodiment, the upper concavities 16 and the lower concavities 19 constitute a plurality of through bores each having a circular cross-section, and such through bores are easy to process. In other embodiments, the through bores may have other closed-shaped cross-sections. If the through bores have an elliptical shaped cross-section, the through bores may be formed such that major axes of the cross-sections of the through bores surround the pivot axis (P) to thereby reduce a peak stress.

Moreover, in addition to the configurations of the head segment 11, the thickness of the integrally molded cover layer 3 may also affect the resistance of the integrally molded cover layer 3 to stress. The upper and lower portions 31, 34 may have a thickness not less than 2.5 mm and the cam portion 33 may have a thickness ranging from 0.5 mm to 2.0 mm.

FIGS. 7 to 11 illustrate a wear-resistant actuating lever 1 of a locking coupling assembly (not shown) according to a second embodiment of the disclosure. The wear-resistant actuating lever 1 of the second embodiment can be made according to the process disclosed in the first embodiment using the mold 2 (see FIG. 6B), and is similar to the wear-resistant actuating lever 1 of the first embodiment except that, in the second embodiment, the head segment 11 further includes an open channel 140.

Figure 7:
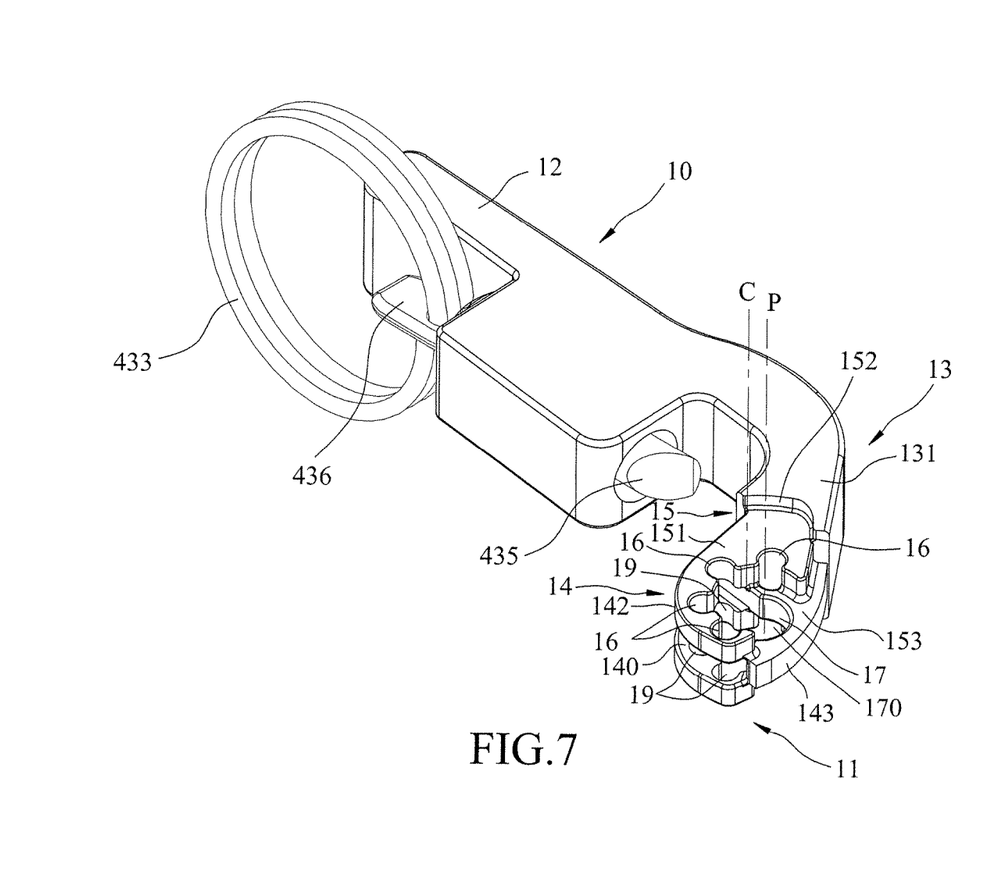
FIG. 7 is a perspective view illustrating a lever body of a wear-resistant actuating lever of a locking coupling assembly according to a second embodiment of the disclosure.
Figure 8:
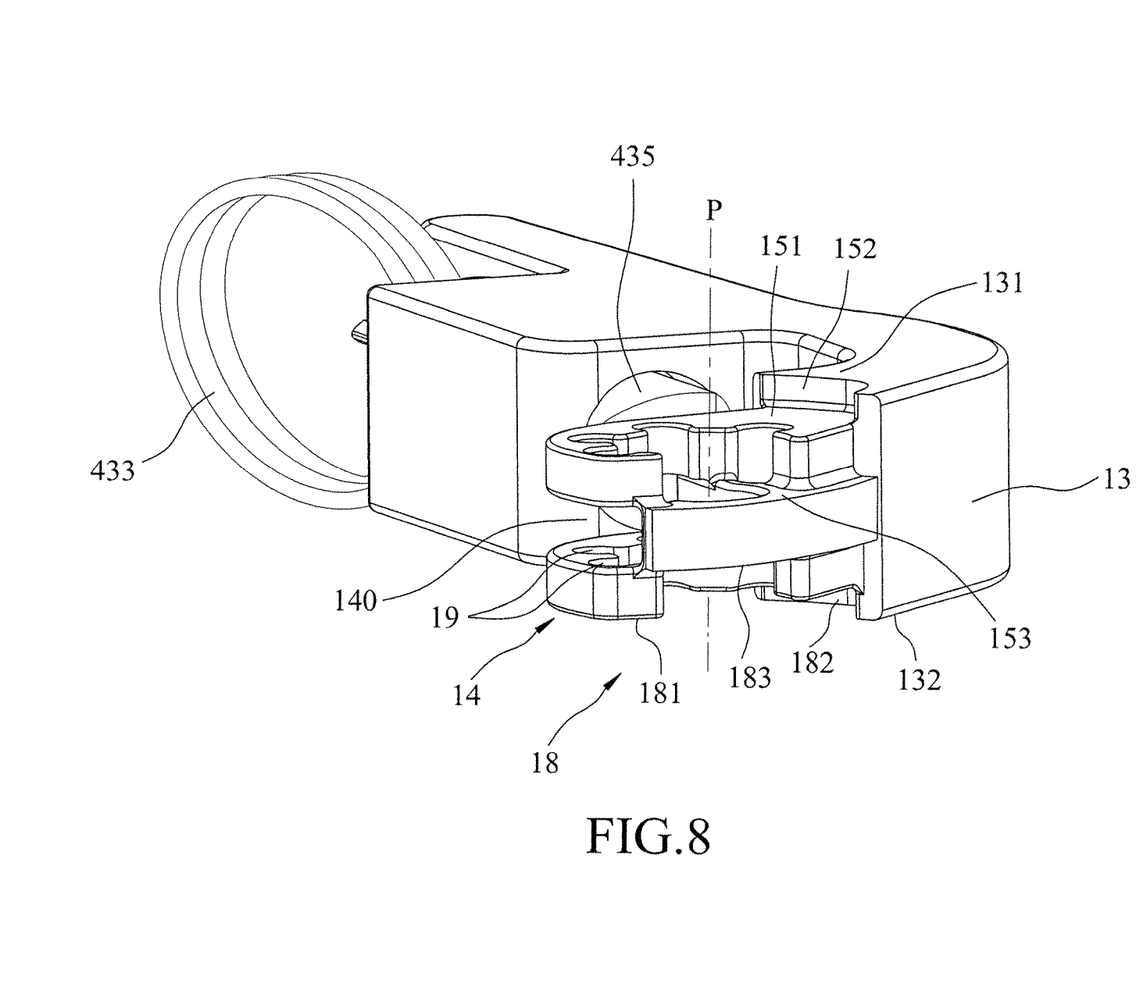
FIG. 8 is a side perspective view of the lever body according to the second embodiment of the disclosure.
Figure 9:
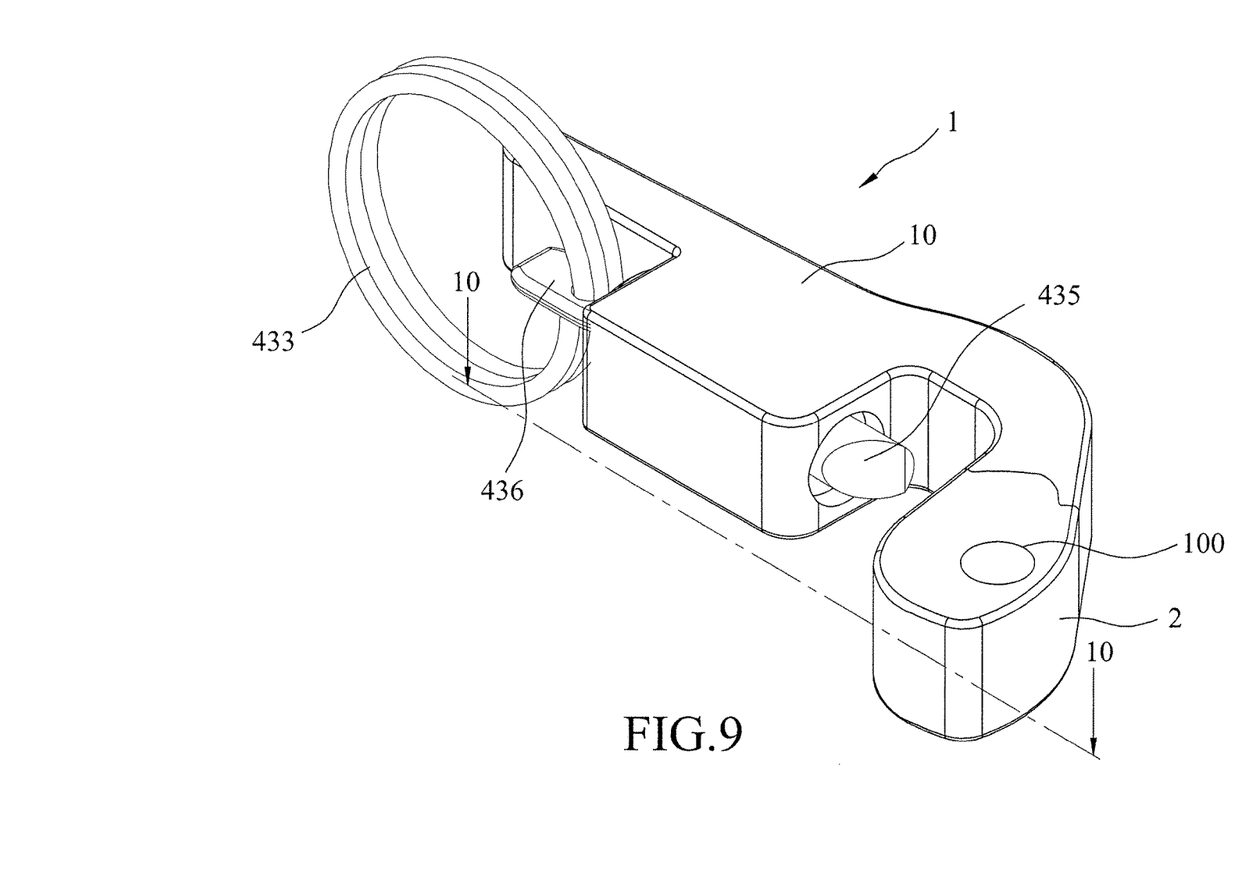
FIG. 9 is a perspective view of the wear-resistant actuating lever according to the second embodiment of the disclosure.
Figure 10:
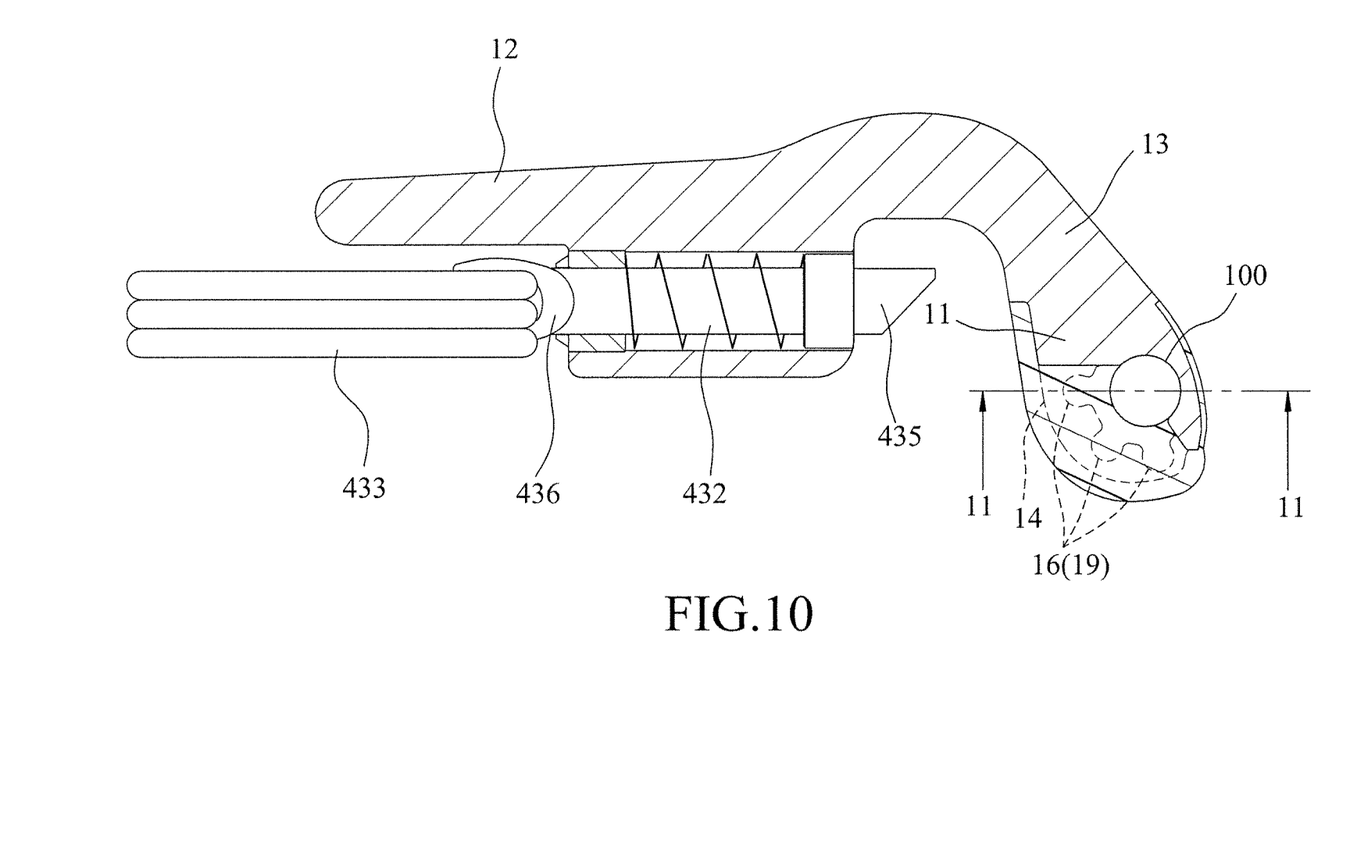
FIG. 10 is a cross-sectional view taken along line 10-10 of FIG. 9.
Figure 11:
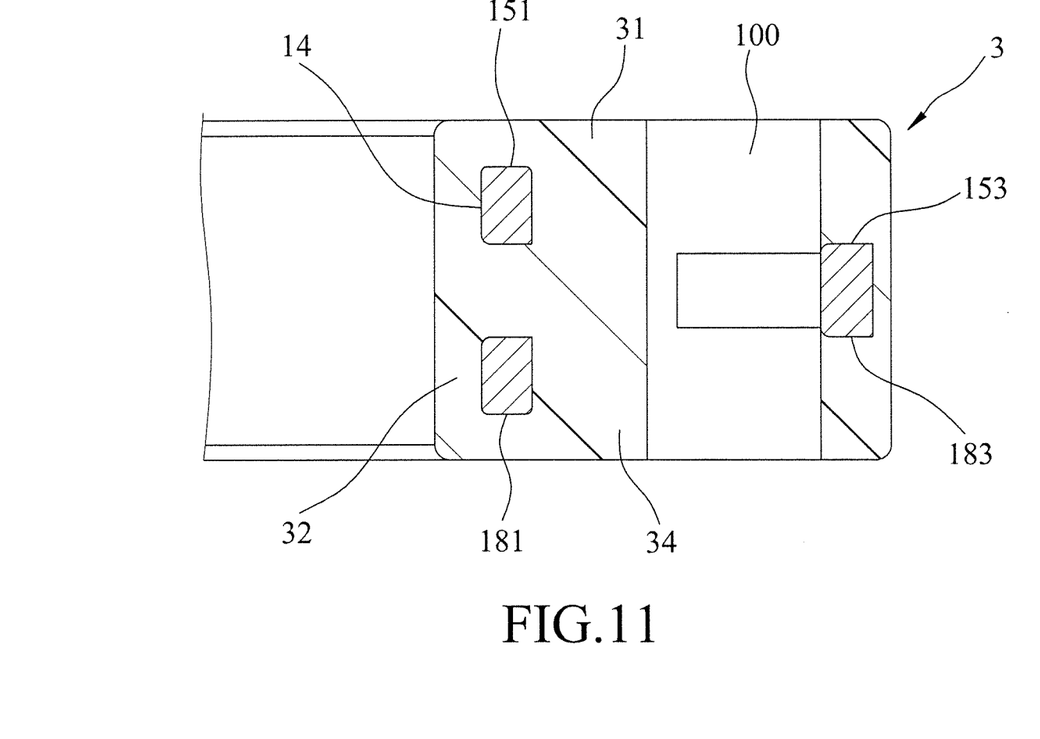
FIG. 11 is a cross-sectional view taken along line 11-11 of FIG. 10.

The open channel 140 is formed in the cam-forming surface 14, and extends radially and inwardly toward the pivot axis (P) such that, in step (b), the open channel 140 is in spatial communication with the upper and lower concavities 16, 19 so as to be filled with the polytetrafluoroethylene-based material in step (c).

Furthermore, the upper major surface 151 has an upper depressed region 153 which extends radially from the pivot axis (P) such that, in step (b), the upper depressed region 153 is in spatial communication with the upper concavities 16 so as to be filled with the polytetrafluoroethylene-based material in step (c). The lower major surface 181 has a lower depressed region 183 which extends radially from the pivot axis (P) such that, in step (b), the lower depressed region 183 is in spatial communication with the lower concavities 19 so as to be filled with the polytetrafluoroethylene-based material in step (c).

As shown in FIG. 7, the cam-forming surface 14 has proximate and distal surface regions 142, 143 which are adapted to be respectively disposed proximate to and distal from the annular grooved surface 421 of the male coupling tube 42 (see FIG. 2). The open channel 14 is formed in the proximate surface region 142. The upper depressed region 153 extends from the distal surface region 143 to the upper concavities 16. The lower depressed region 183 extends from the distal surface region 143 to the lower concavities 19.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A process of making a wear-resistant actuating lever of a cam-lock actuating device, the wear-resistant actuating lever having a pivot hole extending along a pivot axis for permitting the wear-resistant actuating lever to be pivotally mounted to a lug of a locking coupling assembly, the process comprising steps of:
    (a) providing a lever body including a head segment, an arm segment opposite to the head segment in a lengthwise direction, and a neck segment disposed between the head segment and the arm segment, the head segment defining a central line parallel to the pivot axis, and including
        a cam-forming surface extending angularly about the central line,
        an upper cut-out portion having an upper major surface to which the central line is normal, and an upper shoulder surface which is between the upper major surface and an upward surface of the neck segment,
        at least one upper concavity in the upper major surface, and
        a through hole formed in the upper major surface and extending along the pivot axis through the head segment;
    (b) disposing the head segment of the lever body in a mold cavity of a mold, the mold including upper and lower mold halves which have upper and lower interior surfaces, respectively, the upper and lower interior surfaces of the upper and lower mold halves cooperatively defining therebetween the mold cavity, the mold further including a sprue through which a polytetrafluoroethylene-based material is permitted to be injected into the mold cavity, the upper and lower interior surfaces being patterned such that the upper major surface, the upper shoulder surface, and the upper interior surface cooperatively define thereamong an upper space which has a contour substantially the same as a contour of the upper cut-out portion, such that the cam-forming surface is spaced apart from the upper and lower interior surfaces by a predetermined clearance which extends upwardly so as to be in spatial communication with the upper space, and such that an axial space is defined within the through hole for serving as the pivot hole, the axial space being not in spatial communication with the upper space; and
    (c) injecting the polytetrafluoroethylene-based material into the mold cavity through the sprue under a high pressure to fill the upper space, the predetermined clearance, and the upper concavity with the polytetrafluoroethylene-based material to thereby obtain an integrally molded cover layer which includes an upper portion covering the upper major surface, an upper protuberance portion formed in the upper concavity, and a cam portion covering the cam-forming surface.

2. The process according to claim 1, wherein the head segment further includes
    a lower cut-out portion having a lower major surface to which the central line is normal, and a lower shoulder surface which is between the lower major surface and a downward surface of the neck segment, and
    at least one lower concavity in the lower major surface and extending toward the upper major surface;
    wherein, in step (b), the lower major surface, the lower shoulder surface, and the lower interior surface cooperatively define thereamong a lower space which has a contour substantially the same as a contour of the lower cut-out portion, the predetermined clearance extending downwardly to be in spatial communication with the lower space; and
    wherein, in step (c), the polytetrafluoroethylene-based material injected into the mold cavity through the sprue under high pressure to further fills the lower space and the lower concavity, and the integrally molded cover layer further including a lower portion covering the lower major surface, and a lower protuberance portion formed in the lower concavity.

3. The process according to claim 2, wherein the upper and lower concavities extend to communicate with each other.

4. The process according to claim 2, wherein the cam-forming surface is formed with a plurality of grooves which are displaced from one another about the central line.

5. The process according to claim 2, wherein the upper and lower portions are flush with the upward and downward surfaces of the neck segment, respectively.

6. The process according to claim 3, wherein the head segment includes a plurality of the upper concavities and a plurality of the lower concavities, the upper concavities being displaced from one another about the pivot axis, the lower concavities being displaced from one another about the pivot axis.

7. The process according to claim 6, wherein the head segment further includes an open channel which is formed in the cam-forming surface, and which extends radially and inwardly such that, in step (b), the open channel is in spatial communication with the upper and lower concavities so as to be filled with the polytetrafluoroethylene-based material in step (c).

8. The process according to claim 7, wherein the upper major surface has an upper depressed region which extends radially from the pivot axis such that, in step (b), the upper depressed region is in spatial communication with the upper concavities so as to be filled with the polytetrafluoroethylene-based material in step (c); and
    wherein the lower major surface has a lower depressed region which extends radially from the pivot axis such that, in step (b), the lower depressed region is in spatial communication with the lower concavities so as to be filled with the polytetrafluoroethylene-based material in step (c).

9. The process according to claim 1, wherein the pivot hole has a dimension substantially the same as that of the through hole.

10. A wear-resistant actuating lever made by the process according to claim 1.

* * * * *